United States Patent [19]

Ishizaka

[11] Patent Number: 5,304,768

[45] Date of Patent: Apr. 19, 1994

[54] WELDING MANAGEMENT APPARATUS

[75] Inventor: Yuji Ishizaka, Tokyo, Japan

[73] Assignee: Kabushiki Kaisha Meidensha, Tokyo, Japan

[21] Appl. No.: 868,494

[22] Filed: Apr. 15, 1992

[30] Foreign Application Priority Data

Apr. 16, 1991 [JP] Japan .................................. 3-083917

[51] Int. Cl.$^5$ .............................................. B23K 13/08
[52] U.S. Cl. ...................................... 219/61.2; 219/110
[58] Field of Search ....................... 219/61.2, 61.5, 110

[56] References Cited

U.S. PATENT DOCUMENTS

| 3,253,112 | 5/1966 | Worden ............................... 219/61.2 |
| 3,573,416 | 4/1971 | Drechsler ............................ 219/61.2 |
| 4,491,719 | 1/1985 | Corby, Jr. ............................ 219/124 |
| 4,594,497 | 6/1986 | Takahaski et al. ................... 219/130 |
| 4,649,256 | 3/1987 | Minamida et al. .................... 219/121 |

FOREIGN PATENT DOCUMENTS

| 0116798 | 8/1984 | European Pat. Off. ........ B23K 9/02 |
| 0165501 | 12/1985 | European Pat. Off. ........ B23K 9/02 |
| 2850978 | 5/1980 | Fed. Rep. of Germany .......... B23K 13/02 |
| 2575686 | 7/1986 | France ......................... B23K 13/00 |
| 63-303684 | 12/1988 | Japan .................................... 219/61.2 |
| 1303325 | 4/1987 | U.S.S.R. ................................ 219/61.2 |

Primary Examiner—Clifford C. Shaw
Attorney, Agent, or Firm—Foley & Lardner

[57] ABSTRACT

A welding management apparatus for use with a tube production machine adapted to form a workpiece fed from a roll of metal strip in a tubular formation having side surfaces opposite to each other, provide an upsetting pressure to butt the opposite side surfaces of the workpiece at a jointing point, and supply a high frequency power to the workpiece to weld the opposite side surfaces at a welding point so as to produce a metal tube. The welding management apparatus comprises a camera positioned to have a visual field including the jointing and welding points for producing a video signal indicative of an image of the visual field. The video signal is converted into a luminance distribution pattern used in controlling the high frequency power to the workpiece.

4 Claims, 10 Drawing Sheets

WELDING MANAGEMENT APPARATUS

BACKGROUND OF THE INVENTION

This invention relates to a welding management apparatus and, more particularly, to a welding management apparatus suitable for use with a tube production machine.

Tube production machines have been employed to produce a metal tube member by forming a workpiece fed from a roll of metal strip in a tubular formation having side surfaces opposite to each other, providing an upsetting pressure to butt the opposite side surfaces of the workpiece at a jointing point, and supplying a high frequency power to the workpiece to weld the opposite side surfaces at a welding point. It is the conventional practice to adjust the intensity of the welding heat generated at and near the jointing point by controlling the high frequency power to the workpiece based upon various tube producing conditions that are sensed during the operation of the tube production machine. However, the welding heat intensity is dependent upon a great number of tube producing conditions. It is very difficult, if not impossible, to adjust the welding heat intensity based upon all of the tube producing condition conditions.

SUMMARY OF THE INVENTION

It is a main object of the invention to provide a welding management apparatus which can achieve excellent welding heat control with ease.

Another object of the invention is to provide a welding management apparatus which can infer a cause of defective welding.

There is provided, in accordance with the invention, a welding management apparatus for use with a tube production machine including first means for forming a workpiece fed from a roll of metal strip in a tubular formation having side surfaces opposite to each other, second means for providing an upsetting pressure to joint the opposite side surfaces of the workpiece at a jointing point, and third means for supplying a high frequency power to the workpiece to weld the opposite side surfaces at a welding point so as to produce a metal tube member. The welding management apparatus comprises a camera positioned to have a visual field including the jointing and welding points for producing a video signal indicative of an image of the visual field, an image processor for converting the video signal into a luminance distribution pattern, and a control unit responsive to the luminance distribution pattern for controlling the third means to adjust the high frequency power. Since a number of tube producing conditions are reflected on the luminance distribution pattern, it is possible to provide excellent welding heat control.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
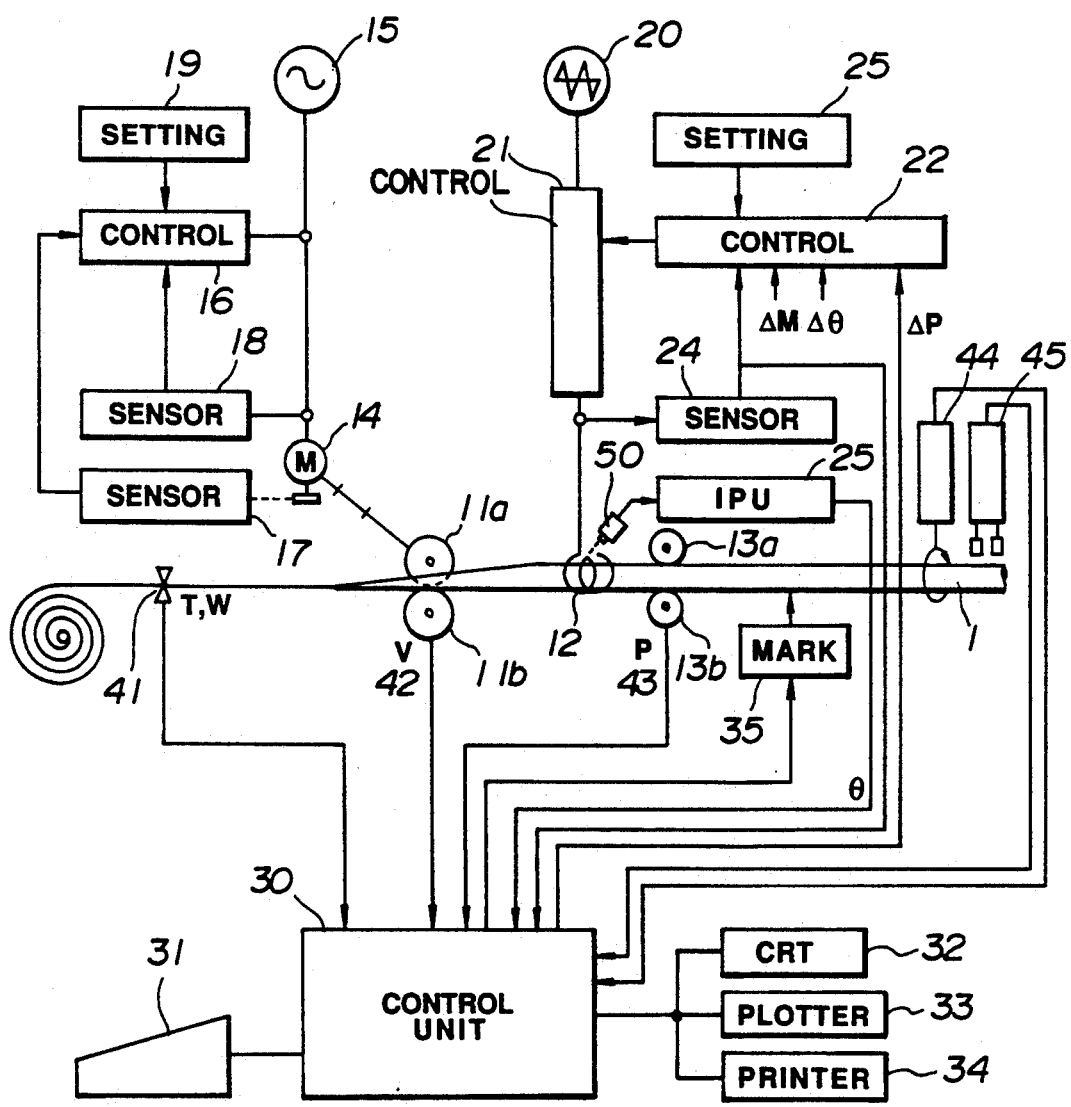
FIG. 1 is a schematic block diagram showing one embodiment of a welding management apparatus made in accordance with the invention.
Figure 2:
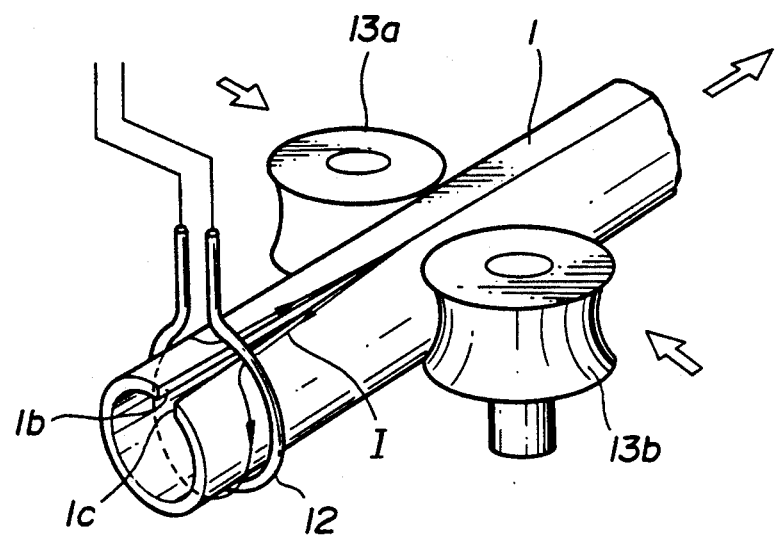
FIG. 2 is a fragmentary perspective view showing the welding section included in a tube production machine to which the invention is applicable.

With reference to the drawings, and in particular to FIG. 1, there is shown a schematic diagram of a welding management apparatus embodying the invention. Although the welding management apparatus will be described in connection with a tube production machine employing a high frequency induction welding unit, it is to be understood that the invention is also applicable to other types of tube production machine. The tube production machine, generally designated by the numeral 10, employs a pair of forming rollers 11a and 11b, a heating coil 12, and a pair of squeeze rollers 13a and 13b to produce an elongated tube from a metal strip. In practice, the forming rollers are arranged in a number of stages to form a workpiece 1 fed from a roll of metal strip in a tubular formation. The squeeze rollers 13a and 13b are positioned on the opposite sides of the workpiece 1 and they provide an upsetting pressure to joint the opposite side surfaces of the workpiece 1 at a jointing point 1a just upstream of a point intermediate between the squeeze rollers 13a and 13b. The heating coil 12 is positioned to surround the workpiece 1 at a position upstream of the jointing point. The heating coil 12 is supplied with a high frequency power to produce a highly concentrated, rapidly alternating magnetic field so as to induce an electric potential in the workpiece 1. This electric potential causes heating because of $I^2 \cdot R$ losses at a welding point just downstream of the jointing point 1a where the opposite side surfaces 1b and 1c of the workpiece 1 are welded, as best shown in FIG. 2. The V-shaped gap, which is defined near the jointing point 1a by the opposite side surfaces 1a and 1b of the workpiece 1, is referred to as a V throat.

An electric motor 14 is powered from a source 15 of power to drive at least one of the forming rollers 11a and 11b. The speed of travel of the workpiece 1, this being determined by the level of the power to the electric motor 14, is determined from calculations performed in a motor control circuit 16, these calculations being based upon sensed conditions including the speed of the electric motor 14, the power applied to the electric motor 14, and a target value set for the power to the electric motor 14. Thus, a motor speed sensor 17, a power sensor 18 and a power setting device 19 are connected to the motor control circuit 16. The motor speed sensor 17 is provided at a position for sensing the speed of rotation of the electric motor 14 and it produces an electric signal indicative of the sensed motor speed. The power sensor 18 is placed at a position for sensing the power supplied to the electric motor 14 and it produces an electric signal indicative of the sensed power level. The power setting device 19 is used to manually set a target value for the power to the electric motor 14. The motor control circuit 16 controls the power to the electric motor 14 to the target value so as to maintain the motor speed at a desired value.

The heating coil 12 is powered from a high frequency power source 20 through a power control circuit 21. The welding heat under which the workpiece 1 is welded at the welding point, this being determined by the level of the power applied to the heating coil 12, is determined from calculations performed in a high frequency output control circuit 22, these calculations being made basically based upon the level of the power applied to the heating coil 12 and a target value set for the power to the heating coil 12. Thus, a power sensor 24 and a power setting device 25 are connected to the high frequency output control circuit 22. The power sensor 24 is provided at a position for sensing the level of the power supplied to the heating coil 12 and it produces a signal indicative of the sensed power level. The power setting device 24 is used to manually set a target value for the power to the heating coil 12. The high frequency output control circuit 22 produces a control signal, causing the power control circuit 21 to maintain the power to the heating coil 12 at the target value.

Figure 3:
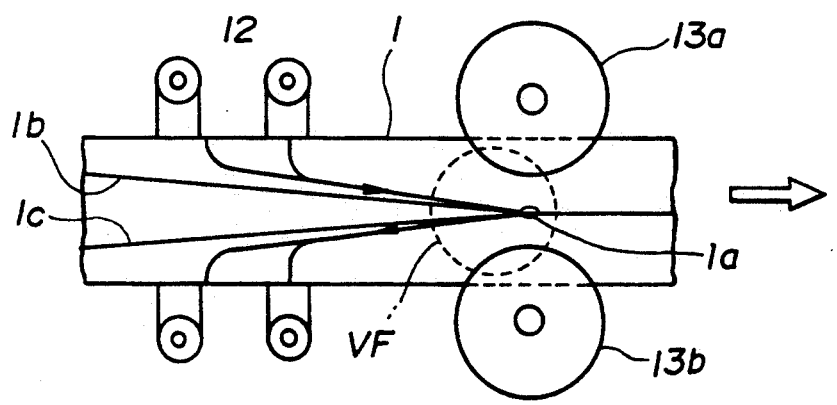
FIG. 3 is a fragmentary plan view showing a visual field of a camera used in the welding management apparatus of the invention.

The high frequency output control circuit 22 also responds to correction signals ΔP, Δθ and ΔT fed thereto from a control unit 30 by controlling the power control circuit 21 to adjust the power to the heating coil 12 in a direction providing an optimum welding heat. The values of these correction signals are determined from calculations performed by a digital computer included in the control unit 30, these calculations being based upon various conditions that are sensed during the operation of the tube production machine. These sensed tube producing conditions includes workpiece thickness T, workpiece width W, workpiece feed speed V, upsetting pressure P and welding heat θ. Thus, a workpiece thickness/width sensor 41, a workpiece feed speed sensor 42, an upsetting pressure sensor 43 and welding heat sensor 50 are connected to the control unit 30. The workpiece thickness/width sensor 41 is placed at a position just downstream of the roll of metal strip to measure the workpiece thickness M1 at one of the opposite edges of the workpiece 1, the workpiece thickness M2 at the other edge of the workpiece 1, and the width M3 of the workpiece 1 and it produces electric signals indicative of the sensed conditions M1, M2 and M3. The workpiece feed speed sensor 42 is associated with at least one of the feeding rollers 11a and 11b to measure the feed speed of the workpiece 1 and it produces an electric signal indicative of the sensed workpiece feed speed V. The upsetting pressure sensor 43 is associated with the squeeze rollers 13a and 13b to sense the upsetting pressure under which the workpiece 1 has its opposite side surfaces butted at the jointing point 1a between the squeeze rollers 13a and 13b and it produces an electric signal indicative of the sensed upsetting pressure P. The welding heat sensor 50 is provided at a position for sensing the welding heat inputted at a welding point of the workpiece 1 and it produces an electric signal θ indicative of the sensed welding heat. The welding heat sensor 50 is taken in the form of a camera positioned above the workpiece 1. The camera 50, which may be of the type having an M×N array of CCD elements, is directed to have a visual field VF including the jointing and welding points, as shown in FIG. 3.

Figure 4:
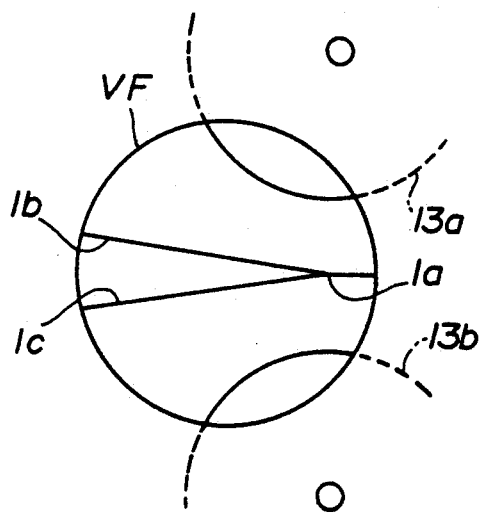
FIGS. 4A to 4D are fragmentary plan views showing four different welding heat conditions which may appear in the visual field of the camera.
Figure 4:
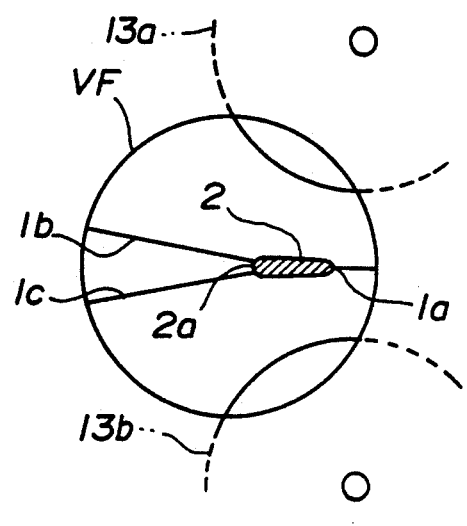
Figure 4:
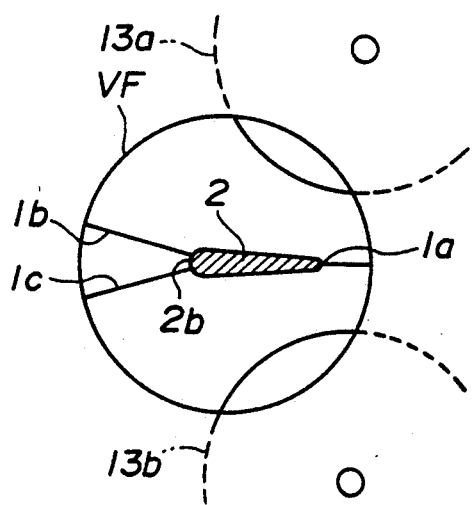
Figure 4:
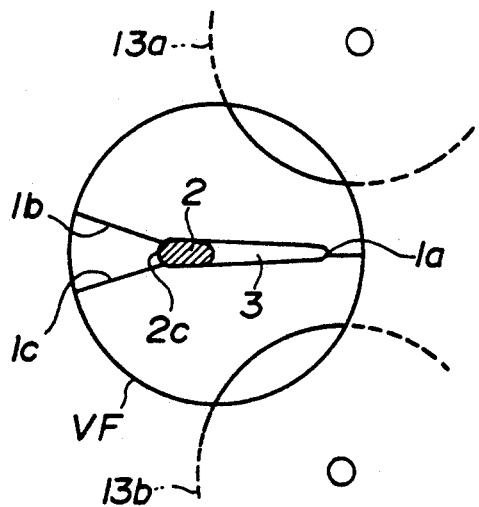

FIGS. 4A to 4C show different welding conditions which may appear in the vidual field of the camera 50. FIG. 4A shows a first welding condition where the opposite side surfaces 1b and 1c of the workpiece 1 are connected at the jointing point 1a. The first welding condition results from an insufficient welding heat. FIG. 4B shows a second welding condition where the opposite side surfaces 1b and 1c are connected at a point 2a upstream of the jointing point 1a by melted metal 2. An arc occurs frequently at the point 2a. The second welding condition occurs when the welding heat is within an appropriate range. FIG. 4C shows a third welding condition where the opposite side surfaces 1b and 1c are connected at a point 2b upstream of the jointing point 1a by melted metal 2. An arc occurs frequently at the point 2b. The distance between the points 1a and 2b, that is, the length of the melted metal 2, is greater than the distance between the points 1a and 2a. The third welding condition occurs at a welding heat greater than provided for the second welding condition. FIG. 4D shows a fourth welding condition where the opposite side surfaces 1b and 1c are connected at a point 2c upstream of the jointing point 1a by melted metal 2. The melted metal 2 moves violently between the points 1a and 2c and it cannot cover the whole area between the points 1a and 2c to form an aperture 3 behind the melted metal 2. An arc occurs frequently at the point 2c. The fourth welding condition results from an excessive welding heat.

The image formed on the CCD elements is scanned in a series of raster scan lines and converted into a video signal for application to the image processing unit 51. It is to be understood that the image formed on the CCD elements has synthetical information on which various welding conditions are reflected. The image processing unit 51 receives a video signal from the camera 51 and digitally stores the inputted image. The stored image A is represented by an M×N array of pixels. Each pixel A(x,y) is assigned a value representation of its intensity. The image processing unit 12 scans the stored image A in a series of raster scan lines to convert it into a black/white image B represented by an array of pixels. Each pixel B(x,y) has a value of 0 or 1. B(x,y)=0 represents a white pixel, while B(x,y)=1 represents a black pixel. In order to avoid the influence of the vapor and other disturbances near the jointing point 1a, the image processing unit 51 may be arranged to differentiate the signal obtained when the stored image A is scanned in a series of raster scan lines and to convert the differentiated signal into the black/white image B. The image processing unit 51 counts the number θ1 of white pixels of the stored image B and produces an electric signal θ corresponding to the counted white pixel number θ1.

The electric signal $\theta$ represents the white area of the stored image B and, thus, the intensity of the welding heat. The image processing unit 51 may be arranged to produce the electric signal $\theta$ by counting the number $\theta2$ of white pixels arranged to form a longitudinal center line on the stored image.

The control unit 30 also receives information as to whether or not the welded tube is defective. For this purpose, an eddy current crack detector 44 and an ultrasonic flaw detector 45 are positioned downstream of the squeeze rollers 13a and 13b. Each of the detectors 44 and 45 produces a defective tube indication signal when a welded tube defect is detected. A key board 31 is used to input various setting values into the control unit 30. The control unit 30 produces a command signal to the control circuit 22. The control unit 30 also makes a fuzzy inference of the cause of the defective welding condition and outputs the inferred cause through a CRT 32, a plotter 33 and a printer 34. A maker 35 is provided for making a mark on the welded tube 1 on command from the control unit 30, for example, when a defective welding condition occurs.

Figure 5:
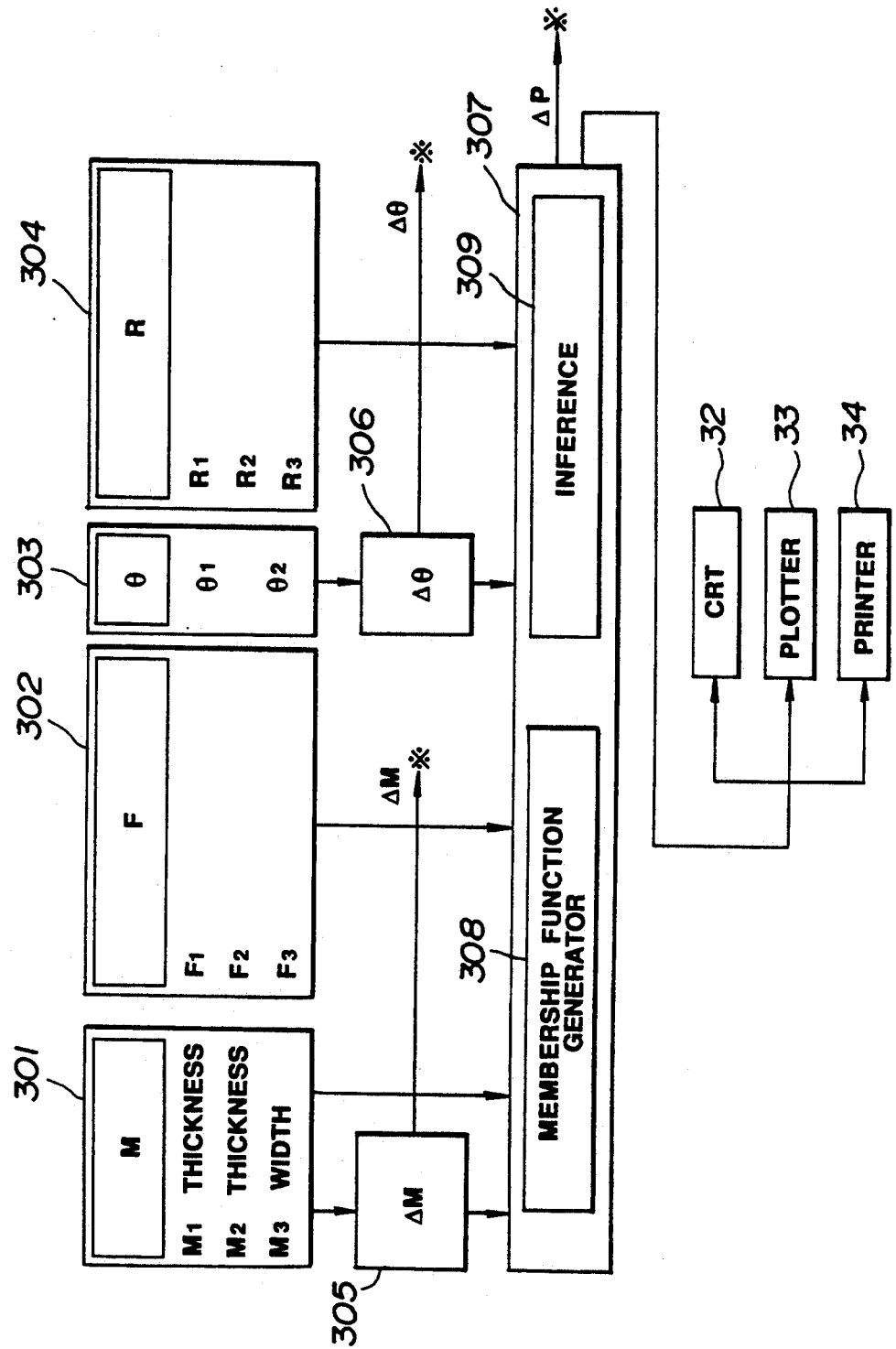
FIG. 5 is a schematic block diagram showing the detailed arrangement of the control unit used in the welding management apparatus of the invention.

Referring to FIG. 5, the control unit 30 has various monitor blocks 301, 302, 303 and 304. The first monitor block 301 is connected to the workpiece thickness/-width sensor 41 and it monitors the workpiece conditions M including the workpiece thicknesses M1 and M2, the workpiece width M3 and the like. The second monitor block 302 monitors the tube forming conditions F including the edge height F1, the humidity F2, the oxygen concentration F3 and the like. The third monitor block 303 monitors the white pixel numbers $\theta1$ and $\theta2$ representing the welding heat intensity $\theta$ obtained through the camera 50. The fourth monitor block 304 monitors the welding machine conditions R including the workpiece feeding speed R1, the squeeze roller distance R2, the upsetting pressure R3 and the like. The monitored conditions are transferred from these monitor blocks to a fuzzy inference block 307. The control unit 30 also includes calculation blocks 305 and 306. The first calculation block 305 receives the measured thickness values M1 and M2 from the first monitor block 31 and it calculates a deviation $\Delta M$ of the average value of the measured workpiece thickness values $(M1+M2)/2$ with respect to a target value Ms set for the workpiece thickness as $\Delta M = (M1+M2)/2 - Ms$. The calculated deviation $\Delta M$ is transferred from the first calculation block 305 to the fuzzy inference section 307 and also to the high frequency output control circuit 22. The second calculation block 306 receives the monitored welding heat condition $\theta$ from the third monitor block 303 and it calculates a deviation $\Delta\theta$ of the monitored welding heat condition $\theta$ with respect to a target value $\theta s$ set for an optimum welding heat condition. The calculated deviation $\Delta\theta$ is transferred from the second calculation block 306 to the fuzzy inference section 307 and also to the high frequency output control circuit 22. The fuzzy inference section 307 includes a membership function generator section 308 and an interference section 309. The membership function generator section 308 stores and produces membership functions for the elements of each of fuzzy sets classified for each of the monitored conditions M1, M2, M3, ... $\Delta M$, F1, F2, F3 ..., $\theta1$, $\theta2$, ... $\Delta\theta$, R1, R2, R3, ... The membership functions use grades ranging from 0 to 1 to define the respective elements included in the fuzzy set. The membership function generator 308 specifies one of the fuzzy sets in which the sensed value for one of the monitored conditions is classified. For example, the fuzzy sets may be PB (positive big), ZE (zero) and NB (negative big). The fuzzy set ZE corresponds to a range where the sensed value is appropriate for the monitored condition. The fuzzy set PB corresponds to a range where the sensed value is excessive for the monitored condition. The fuzzy set NB corresponds to a range where the sensed value is insufficient for the monitored condition. The grade indicates the extent to which the sensed value may be considered to have the characteristic specified for the fuzzy set. The inference section 308 utilizes the fuzzy set specified for the monitored conditions to make a fuzzy inference of the cause of defective welding. For this purpose, the control unit 30 includes a computer memory for storing fuzzy rules each of which specifies the degree of the possibility of the cause of a defective welding condition. The fuzzy rules may be obtained experimentally or derived empirically. One example of a fuzzy rule suitable for use with the fuzzy inference section 38 is shown in Table 1.

TABLE 1

| PARAMETER A (*) OUTPUT POWER | PARAMETER B (#) PIXEL NUMBER | INFERENCE POSSIBILITY OF WELDING HEAT DEFECT GREAT ←→ SMALL | | | |
|---|---|---|---|---|---|
| * = PB | # = PB | ⑤ | 4 | 3 | 2 | 1 |
|  | # = ZE | 5 | ④ | 3 | 2 | 1 |
|  | # = NB | 5 | 4 | ③ | 2 | 1 |
| * = ZE | # = PB | 5 | ④ | 3 | 2 | 1 |
|  | # = ZE | 5 | 4 | ③ | 2 | 1 |
|  | # = NB | 5 | 4 | 3 | ② | 1 |
| * = NB | # = PB | 5 | 4 | ③ | 2 | 1 |
|  | # = ZE | 5 | 4 | 3 | ② | 1 |
|  | # = NB | 5 | 4 | 3 | 2 | ① |

If the value sensed for the output power R1 is classified in the fuzzy set PB and the value sensed for the white pixel number $\theta1$ is classified in the fuzzy set PB, then the possibility that the defective welding condition may be caused by defective welding heat is very great (grade 5). Alternatively, if the value sensed for the output power R1 is classified in the fuzzy set NB and the value sensed for the white pixel number $\theta1$ is classified in the fuzzy set NB, then the possibility that the defective welding condition may be caused by defective welding heat is very small (grade 1). The inferred cause of the defective welding condition is outputted through the CRT 32, the plotter 33 and/or the printer 34. The fuzzy inference section 307 also produces a correction signal $\theta P$ to the high frequency output control circuit 22 which thereby controls the power control circuit 21 in a direction bringing the welding heat to an appropriate value. The inference section 307 calculates an appropriate value for the correction signal $\Delta P$ based upon the inferred cause. The control unit 30 may be arranged to produce a correction signal ΔP having a value corresponding to a deviation of the sensed pixel number θ1 or θ2 with respect to a predetermined reference value. It is to be noted that the pixel number θ1 or θ2 reflects the intensity of the welding heat generated at the welding point. In this case, the control circuit 22 controls the power control circuit 21 in a direction bring the pixel number to the reference value.

Figure 6:
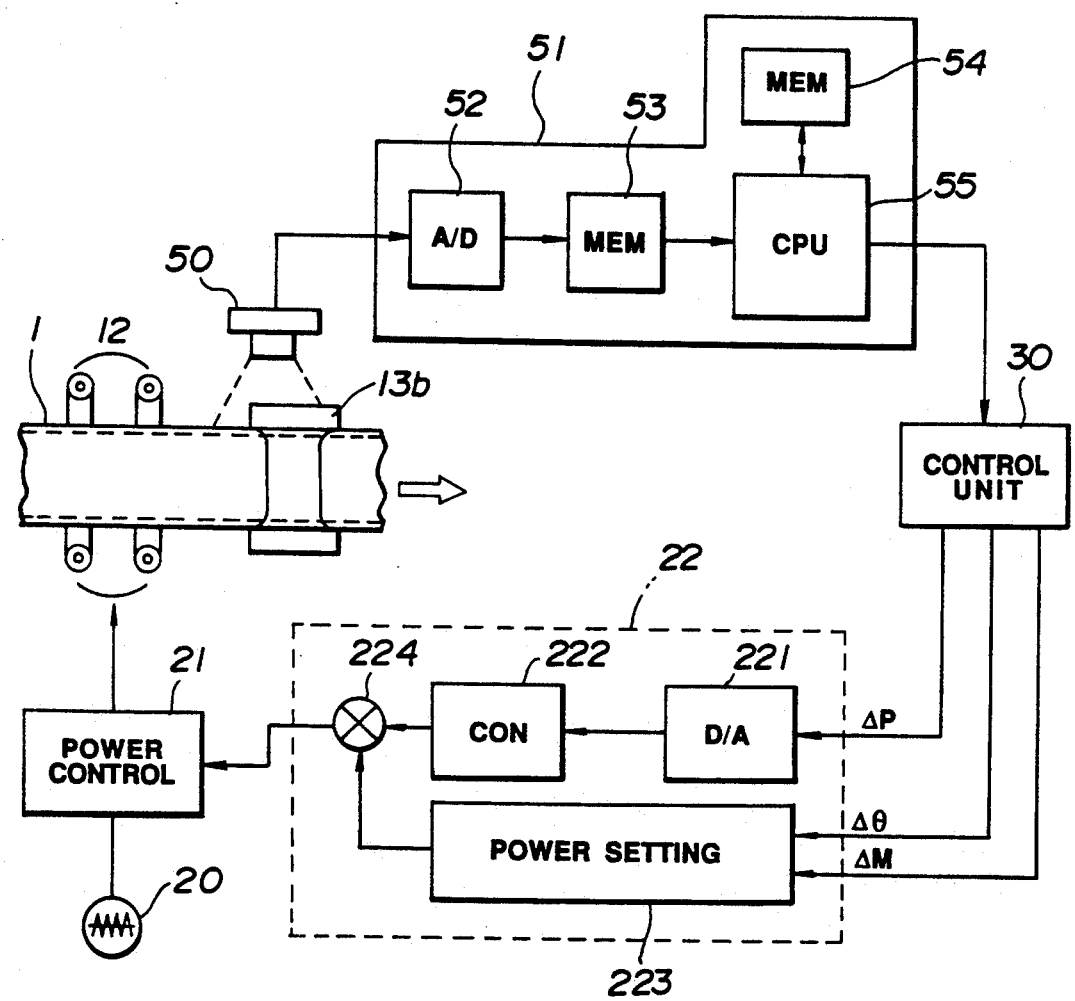
FIG. 6 is a schematic diagram showing the image processor included in the welding management apparatus of the invention.
Figure 7:
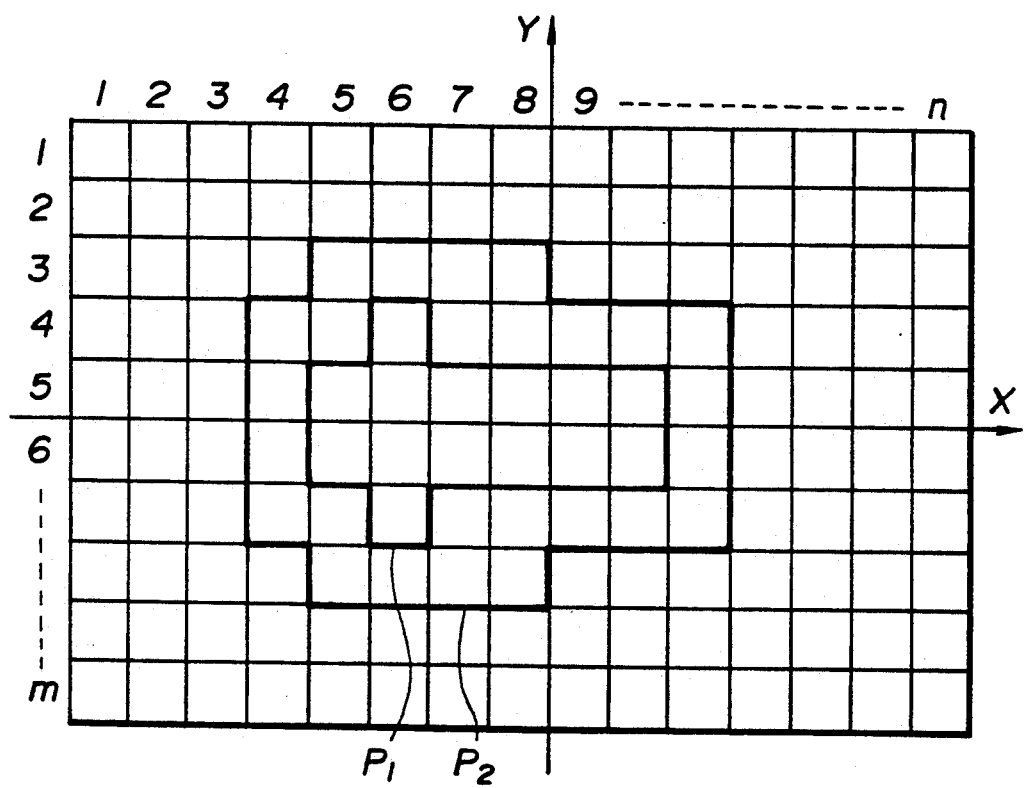
FIG. 7 is a diagram showing a luminance distribution pattern produced in the image processor.

Referring to FIG. 6, there is shown a modified form of the image processing unit 51. In this modification, the image processing unit 51 includes an analog-to-digital converter 52 which receives the video signal from the camera 50 and converts it into digital form having 128 (0 to 127) tones for application to a first image memory 53 which digitally stores an image of the visual field represented by an M×N array of picture elements or pixels. Each pixel is assigned a value representative of its intensity (darkness). The stored image is scanned in a series of raster scan lines to convert it into a luminance (gray histogram) pattern. FIG. 7 shows one example of such a luminance pattern obtained for the third welding condition described in connection with FIG. 4C. The area surrounded by the lines P1 has the highest luminance level and corresponds to the melted metal 2. The area surrounded by the lines P2 corresponds to the workpiece portion adjacent to the melted metal 2.

The image processor 51 also includes a second image memory 54 which stores reference luminance patterns. The digital computer (CPU) 55 makes a determination as to whether or not the welding condition is appropriate by comparing the luminance pattern transferred thereto from the first image memory with the reference image patterns successively transferred thereinto from the second image memory 54. For this purpose, the digital computer 55 may be arranged to compare the area surrounded by the lines P1 with the corresponding area of each of the reference luminance patterns. The area surrounded by the lines P1 corresponds to the area of the melted metal 2 and it corresponds to the intensity of the welding heat. Alternatively, the digital computer 55 may be arranged to compare the longitudinal length of the area surrounded by the lines P1 with the corresponding length of each of the reference luminance patterns. The longitudinal length of the area surrounded by the lines P1 corresponds to the length of the melted metal 2 and it corresponds to the intensity of the welding heat. The digital computer 55 produces a decision signal indicative of the result of the comparison made in the image processing unit 51. The decision signal is fed from the image processing unit 51 to the control unit 30.

The high frequency output control circuit 22 includes a signal converter circuit 221, a signal control circuit 222, a power setting circuit 223 and a summing circuit 224. The signal converter circuit 221 receives the correction signal ΔP from the control unit 30 and converts it into an corresponding analog form for application to the signal control circuit 41. The signal control circuit 222 converts the analog signal into a power control signal. The control signal is supplied to the summing circuit 224. The power setting circuit 223 receives the correction signals Δθ and ΔM and produces a reference power signal to the summing circuit 224. The summing circuit 224 produces a control signal corresponding to a difference of the power control signal fed thereto from the signal control circuit 221 from the reference power signal fed thereto from the power setting circuit 223. The control signal is fed from the summing circuit 224 to cause the power control circuit 21 to control the high frequency power supplied from the power source 15 to the heating coil 12 in a direction providing an appropriate welding heat.

Figure 8A:
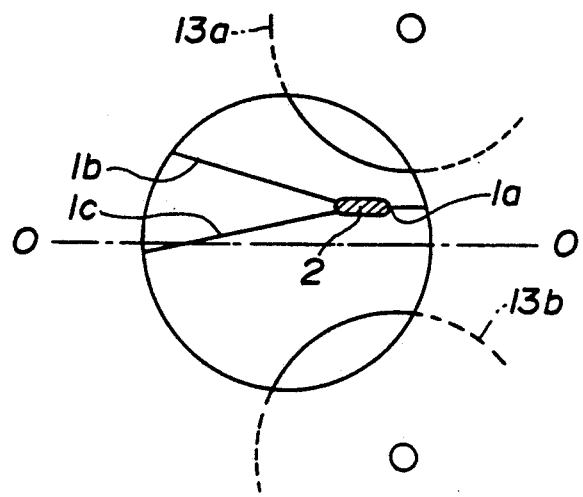
FIGS. 8A and 8B are fragmentary plan views showing two defective welding conditions which may appear in the visual field of the camera.
Figure 8B:
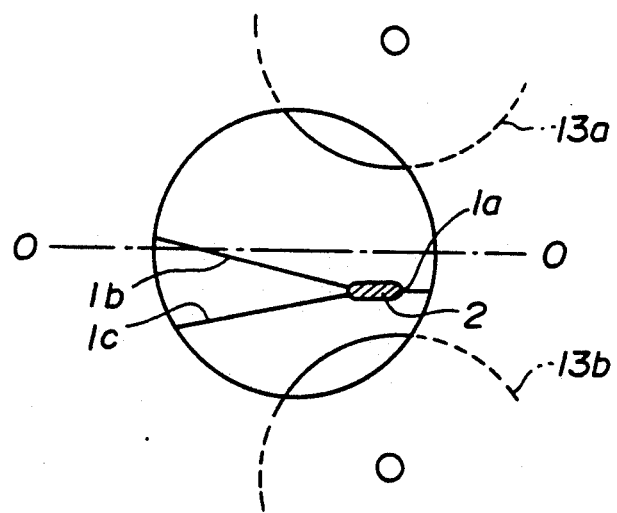

FIGS. 8A and 8B show defective welding conditions which may appear in the vidual field of the camera 50. FIG. 8A shows a defective welding condition where the jointing point 1a of the workpiece 1 is deviated upward from the center line 0—0 extending through the center between the squeeze rollers 13a and 13b. FIG. 8B shows another defective welding condition where the jointing point 1a of the workpiece 1 is deviated from the center line. These defective welding conditions result from the workpiece 1 being twisted to the left or right. The control unit 30 may be arranged to recognize the deviation of the jointing point 1a of the workpiece 1 with respect to the center line 0—0 based upon the luminance pattern produced in the image processing unit 51 and to produce a control signal causing an appropriate device to adjust the forming rollers 11a and 11b in a direction zeroing the deviation.

Figure 9:
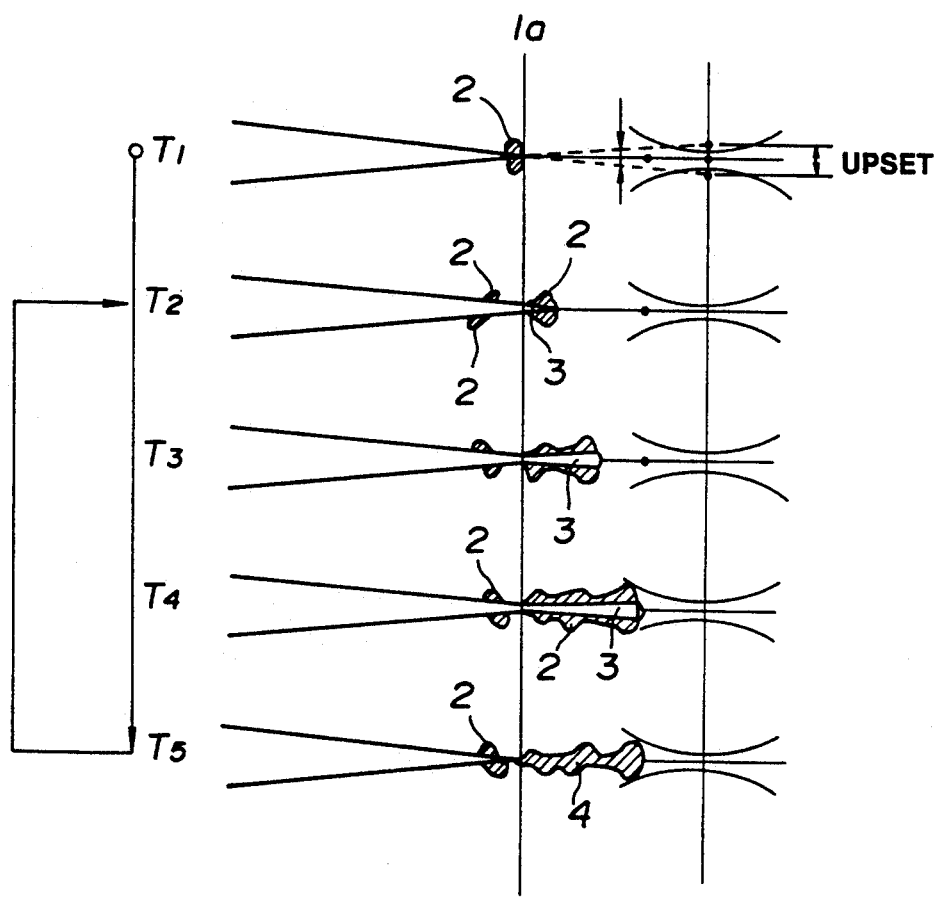
FIG. 9 is a diagram showing aperture forming steps which may occur with the lapse of time when the workpiece is made of iron.
Figure 10:
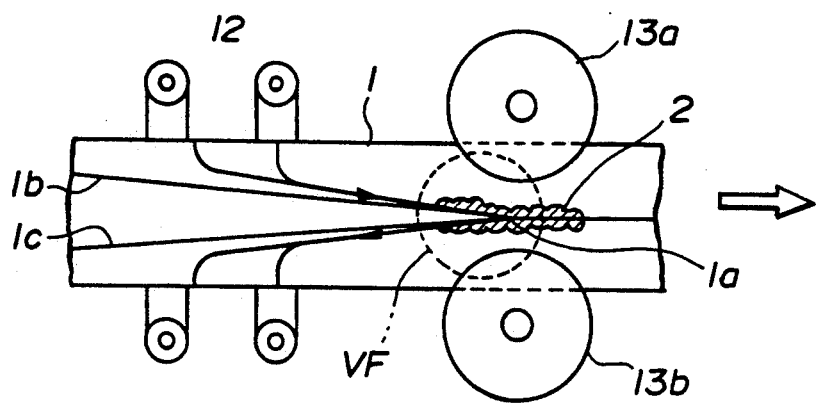
FIG. 10 is a fragmentary plan view showing a visual field of the camera used in the welding management apparatus of the invention for the workpiece made of iron.
Figure 11:
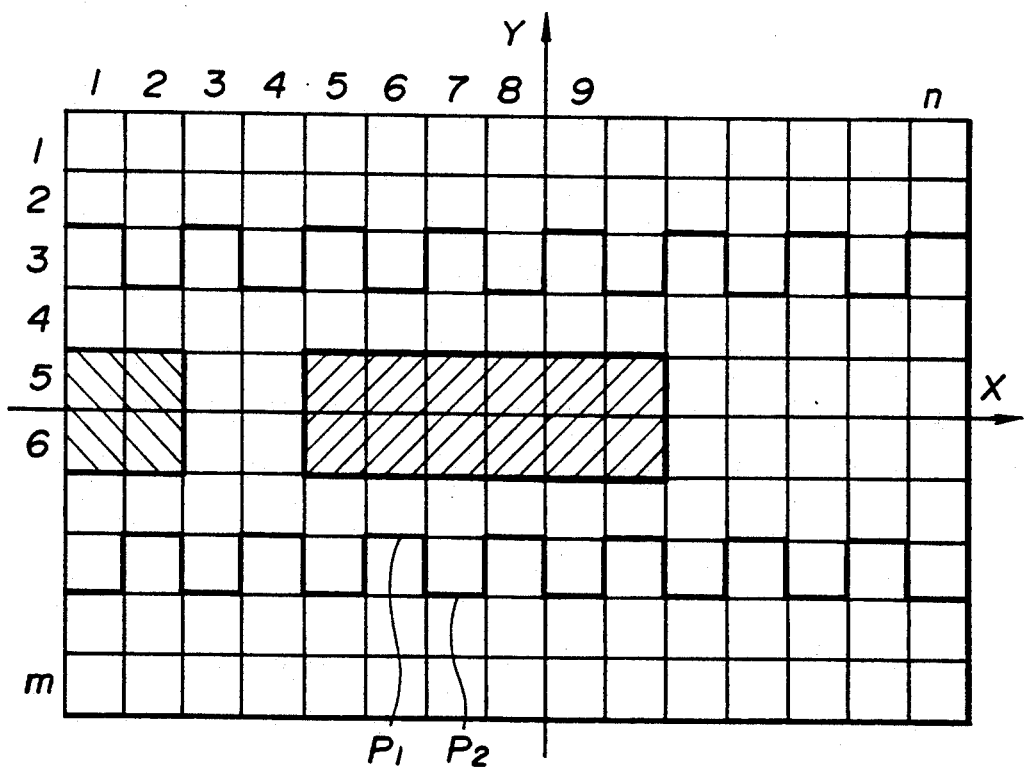
FIG. 11 is a diagram showing a luminance distribution pattern produced in the image processor when the workpiece is made of iron.
Figure 12:
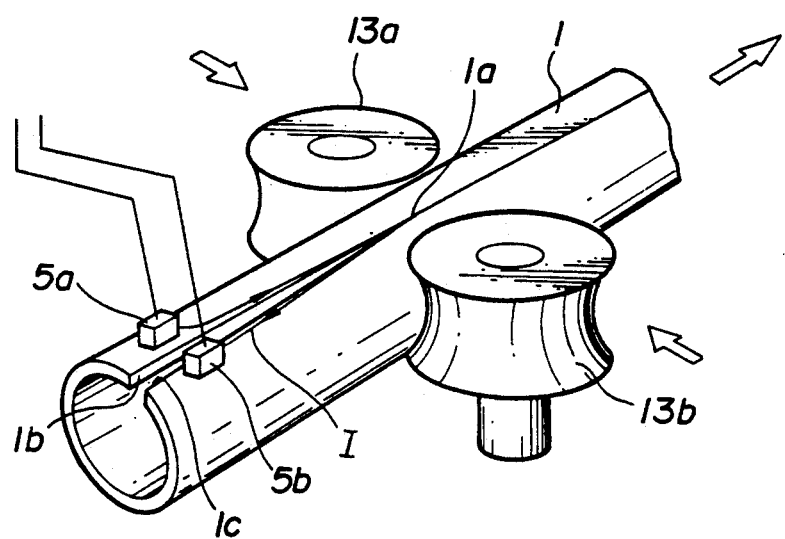
FIG. 12 is a fragmentary perspective view showing another type of welding section included in the tube production machine to which the invention is applicable.

If the workpiece 1 is made of iron, an aperture 3 will be formed near the welding point. FIG. 9 shows aperture forming steps. At time T1, melted metal 2 appears at a position just upstream of the jointing point 1a. At time T2, a magnetic force is applied to push the melted metal 2 out to form an aperture 3. The aperture 3 becomes bigger at time T3. At time T4, the aperture 3 grows to its maximum extent. At time T5, the aperture 3 is filled up with a weld bead 4. These stages are repeated to produce an elongate tubular member. The welding condition may be judged by using the camera 50 to monitor the size and position of the aperture 3. For this purpose, the camera 50 is directed to have a visual field VF including the jointing and welding points, as shown in FIG. 10. FIG. 11 shows the luminance pattern obtained in the image processor 51. The hatched area indicates the aperture 3. The size and/or position of the hatched area is used to control the welding heat generated at the welding point.

While the invention has been described in connection with a high frequency induction welding machine, it is to be understood that it is not limited in any way to this application. For example, the invention is applicable to another type of welding machine as shown in FIG. 10. The welding machine includes a pair of contacts 5a and 5b placed in contact with the workpiece 1 on the opposite sides of a line along which welding is required. The contacts 5a and 5b are supplied with a high frequency power to produce an electric potential in the workpiece 1. This electric potential causes heating because of $I^2 \cdot R$ losses at the jointing point 1a where the opposite side surfaces 1b and 1c of the workpiece 1 are welded.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A welding management apparatus for use with a tube production machine including first means for forming a workpiece fed from a roll of metal strip in a tubular formation having side surfaces opposite to each other, second means for providing an upsetting pressure to joint the opposite side surfaces of the workpiece at a jointing point, and third means for supplying a high frequency power to the workpiece to weld the opposite side surfaces at a welding point so as to produce a metal tube member, the welding management apparatus comprising:
- a camera positioned to have a visual field including the jointing and welding points for producing a video signal indicative of an image of the visual field;
- an image processor for converting the video signal into a luminance distribution pattern; and
- a control unit responsive to the luminance distribution pattern for controlling the third means to adjust the high frequency power, the control unit including means for converting the luminance distribution pattern into a first electric signal indicative of an intensity of welding heat generated at the welding point, means responsive to the first electric signal for controlling the third means to adjust the high frequency power, means sensitive to at least one of tube producing conditions for producing a second electric signal indicative of a sensed tube producing condition, means for storing membership functions defining each of first fuzzy sets provided for the welding heat intensity indicated by the first electric signal, means for storing membership functions defining each of second fuzzy sets provided for the tube producing condition indicated by the second electric signal, means for detecting one of the first fuzzy sets in which the welding heat intensity indicated by the first electric signal is classified, means for detecting one of the second fuzzy sets in which the tube producing condition indicated by the second electric signal is classified, means for inferring a cause of defective welding as a function of the selected fuzzy sets, and means for outputting the inferred cause.

2. The welding management apparatus as claimed in claim 1, wherein the image processor includes means for storing at least one reference luminance distribution pattern, and wherein the control unit includes means for comparing the luminance distribution pattern with the reference luminance distribution pattern to produce the first electric signal.

3. A welding management apparatus for use with a tube production machine including first means for forming a workpiece fed from a roll of metal strip in a tubular formation having side surfaces opposite to each other, second means for providing an upsetting pressure to joint the opposite side surfaces of the workpiece at a jointing point, and third means for supplying a high frequency power to the workpiece to weld the opposite side surfaces at a welding point so as to produce a metal tube member, the welding management apparatus comprising:
- a camera positioned to have a visual field including the jointing and welding points for producing a video signal indicative of an image of the visual field;
- an image processor for converting the video signal into a luminance distribution pattern; and
- a control unit responsive to the luminance distribution pattern for controlling the third means to adjust the high frequency power, the control unit including means for converting the luminance distribution pattern into a first electric signal indicative of an intensity of welding heat generated at the welding point, means responsive to the first electric signal for controlling the third means to adjust the high frequency power, means sensitive to at least one of tube producing conditions for producing a second electric signal indicative of a sensed tube producing condition, means for storing membership functions defining each of first fuzzy sets provided for the welding heat intensity indicated by the first electric signal, means for storing membership functions defining each of second fuzzy sets provided for the tube producing condition indicated by the second electric signal, means for detecting one of the first fuzzy sets in which the welding heat intensity indicated by the first electric signal is classified, means for detecting one of the second fuzzy sets in which the tube producing condition indicated by the second electric signal is classified, means for storing a fuzzy rule specifying degrees of possibility of a cause of a defective welding condition as a function of first and second fuzzy sets, and means for calculating a grade from the fuzzy rule based upon the selected fuzzy sets, and means for controlling the third means to adjust the high frequency power based upon the calculated grade.

4. The welding management apparatus as claimed in claim 3, wherein the image processor includes means for storing at least one reference luminance distribution pattern, and wherein the control unit includes means for comparing the luminance distribution pattern with the reference luminance distribution pattern to produce the first electric signal.

* * * * *